C. BUCHHOLZ.
WEIGHER.
APPLICATION FILED FEB. 17, 1912.
1,137,836.
Patented May 4, 1915.
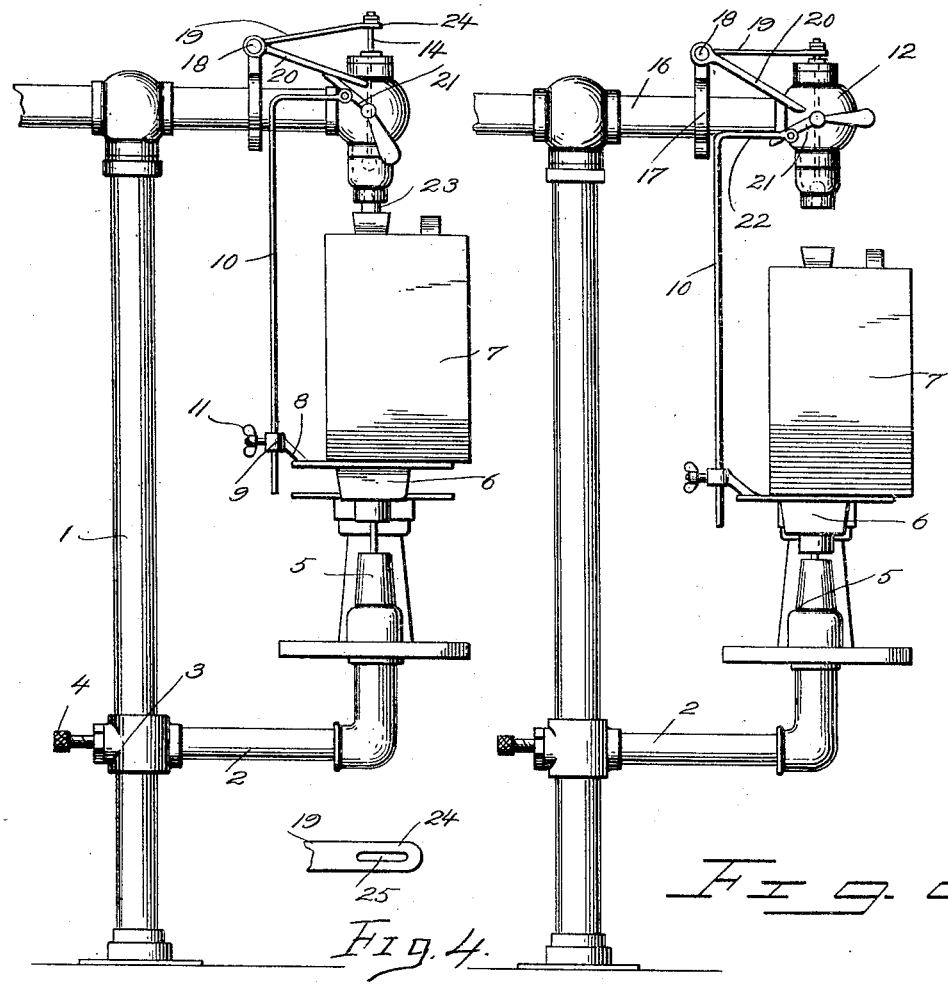
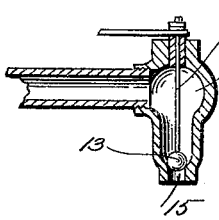
Witnesses
C. M. Simpson
M. P. McKee
Inventor
Charles Buchholz
By Geo. Wedderburn  Attorney

UNITED STATES PATENT OFFICE.

CHARLES BUCHHOLZ, OF CLEVELAND, OHIO.

WEIGHER.

1,137,836. Specification of Letters Patent. Patented May 4, 1915.

Application filed February 17, 1912. Serial No. 678,311.

*To all whom it may concern:*

Be it known that I, CHARLES BUCHHOLZ, citizen of the United States, residing at Cleveland, in the county of Cuyahoga and State of Ohio, have invented certain new and useful Improvements in Weighers, of which the following is a specification.

This invention relates to improvements in automatic means for weighing liquids and has for its object to provide means whereby the flow of liquid may be cut off as soon as the desired amount has been delivered.

With the above and further objects in view which will be more fully explained later in the specification, I have invented the device illustrated in the accompanying drawings in which, Figure 1 is an elevational view of my improved weigher, Fig. 2 is a similar view after a predetermined amount of liquid has been weighed and the flow automatically cut off, and Fig. 3 is a vertical sectional view through a faucet used in connection with my device, and Fig. 4 is a top plan view of a valve operating member.

Like reference characters indicate like parts throughout the specification and in the several views of the drawings in which—

1 indicates a support on which the member 2 is slidable by means of the collar 3, which collar may be secured at any desired height on the support by means of the thumb nut 4. Mounted on the bracket 2 is a set of balance scales 5 of any desired make, having a stand 6 thereon adapted to receive a can 7 or other receptacle into which it is desired to draw the liquid to be measured. On the stand 6 is an arm 8 having a collar 9 on the end thereof, through which the rod 10 passes. The thumb nut 11 is adapted to secure said rod in any desired vertical position in said collar.

12 is a faucet having a valve member 13 therein mounted on a valve stem 14. The valve member 13 is adapted when in a lowered position, as shown in Fig. 3, to close the valve 15 of the faucet 2. This faucet is mounted on the end of a pipe 16 conveying the liquid, and on this pipe is located a collar 17 which carries a pivotally mounted rod 18 to which one end of an arm 19 is fixedly secured, the end 24 of which is loosely connected to the stem 14 by means of a slot 25, whereby said stem may be raised or lowered by the movement of the rod 19. Also fixedly mounted on the rod 18 is a weighted arm 20 adapted to be operated by a lever 21 pivotally mounted on the faucet. This lever is pivotally connected to the right angular portion 22 of the rod 10.

In Fig. 1 the faucet valve is shown open and liquid 23 is shown flowing therefrom into the can 7. When the proper amount of liquid has passed into the can 7 the scale will overbalance and bear upon the rod 10 thereby lowering the lever 21, which will cause the weighted arm 20 to fall into the position shown in Fig. 2, thereby permitting the arm 19 to lower the valve stem 14 and seat the valve member 13 over the valve 15, thus cutting off the flow of liquid.

Having now described my invention, that which I claim and desire to secure by Letters Patent is:

1. The combination of a balance, a faucet, a lever for controlling the valve of said faucet, a weight arm in the path of said lever and interposed connections between the balance and lever whereby the weight of the liquid will actuate said lever to withdraw it from said weight arm to permit the valve to close owing to its weight and the pressure of the liquid and cut off the flow of liquid.

2. The combination of a balance, a faucet, a lever controlling the valve of said faucet, said lever being controlled by the weight of the liquid, a weighted arm having its free end arranged in the path of said lever, and a valve controlled by the movement of the weighted arm.

3. The combination of a balance, a faucet, a lever controlling the valve of said faucet, said lever being controlled by the weight of the liquid, a weighted arm having its free end arranged in the path of said lever, and a rod for controlling the valve of said faucet controlled by the movement of said weighted arm.

4. The combination of a balance, a faucet, a lever, a rod connected therewith and controlled by the movement of the balance, a pivotally mounted rod, an arm having one end fixedly secured thereto and the other end connected with the valve stem of the faucet, and an arm mounted on said pivotally mounted rod and extending into the path of said lever.

5. The combination of a balance, a faucet, a lever, a rod connected therewith and controlled by the movement of the balance, a pivotally mounted rod, an arm having one end fixedly secured thereto and the other end connected with the valve stem of the faucet, and an arm mounted on said pivotally mounted rod and extending into the path of said lever, the arm connected with the stem of the valve having an elongated slot in which said arm is loosely received.

6. The combination of a balance with a faucet, said faucet having a vertical valve stem therein, and means whereby said valve stem may be operated through the medium of said balance, said stem operating means consisting of a pivoted arm, a weighted arm connected to said pivoted arm, and a lever adapted to operate said weighted arm.

7. The combination of a balance with a faucet, said faucet having a vertical valve stem therein, and means whereby said valve stem may be operated through the medium of said balance, said stem operating means consisting of a pivoted arm, a weighted arm connected to said pivoted arm, a lever adapted to operate said weighted arm, and means whereby said balance is adapted to actuate said lever.

In testimony whereof I affix my signature in presence of two witnesses.

CHARLES BUCHHOLZ.

Witnesses:
J. WM. FROMM,
GEORGE BUCHHOLZ.

Copies of this patent may be obtained for five cents each, by addressing the "Commissioner of Patents, Washington, D. C."